United States Patent
Lo et al.

(10) Patent No.: US 10,376,968 B1
(45) Date of Patent: Aug. 13, 2019

(54) ARBOR DAMPING DEVICE

(71) Applicant: LEE CHEE ENTERPRISE CO., LTD., Taichung (TW)

(72) Inventors: Kun-Chi Lo, Taichung (TW); Tsung-Hsin Lu, Taichung (TW)

(73) Assignee: LEE CHEE ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 15/896,758

(22) Filed: Feb. 14, 2018

(51) Int. Cl.
*B23B 29/02* (2006.01)
*B23C 5/00* (2006.01)
*B23B 27/00* (2006.01)

(52) U.S. Cl.
CPC ............ *B23C 5/003* (2013.01); *B23B 27/002* (2013.01); *B23B 29/022* (2013.01)

(58) Field of Classification Search
CPC ....... Y10T 409/304312; Y10T 82/2585; Y10T 82/2595; Y10T 82/30; B23B 29/00; B23B 29/022; B23B 27/00; B23B 27/02; B23B 27/007; B23B 31/02; B23B 31/1075; B23B 31/1179; B23B 31/202; B23B 2228/16; B23B 2231/2048; B23B 2250/16
See application file for complete search history.

(56) References Cited

U.S. PATENT DOCUMENTS

| | | | | |
|---|---|---|---|---|
| 3,242,791 A | * | 3/1966 | Smith | B23B 29/022 188/379 |
| 3,559,512 A | * | 2/1971 | Aggarwal | B23B 29/022 188/322.5 |
| 3,774,730 A | * | 11/1973 | Maddux | B23B 29/022 188/379 |
| 4,385,665 A | * | 5/1983 | Knoll | B25D 17/24 173/162.1 |
| 8,308,404 B2 | * | 11/2012 | Ostermann | B23B 29/022 408/143 |
| 9,533,357 B2 | * | 1/2017 | Frota de Souza Filho | B23B 29/022 |
| 2011/0318130 A1 | * | 12/2011 | Freyermuth | B23B 27/002 409/135 |
| 2013/0206525 A1 | * | 8/2013 | Ogata | B23B 27/002 188/381 |

(Continued)

FOREIGN PATENT DOCUMENTS

| | | |
|---|---|---|
| CN | 206326142 U | 7/2017 |
| JP | 3212758 U | 9/2017 |
| TW | M538855 | 4/2017 |

*Primary Examiner* — Nicole N Ramos
(74) *Attorney, Agent, or Firm* — Muncy, Geissler, Olds & Lowe, P.C.

(57) ABSTRACT

The present invention provides an arbor damping device, including a rod body, a damper, two flexible absorbers and at least one flexible damping adjusting member. The rod body has an internal chamber, and the internal chamber includes a circumferential wall and two end walls. The damper is received in the internal chamber. The damper includes a side surface opposite to the circumferential wall and two end surfaces respectively opposite to the two end walls. The two flexible absorbers are disposed between the two end walls and the two end surfaces respectively. The at least one flexible damping adjusting member is radially disposed between the circumferential wall and the side surface, and axially disposed between the end walls and the two flexible absorbers.

9 Claims, 4 Drawing Sheets

(56) References Cited

U.S. PATENT DOCUMENTS

2015/0375304 A1* 12/2015 Frota de Souza Filho ................. B23B 29/022
408/143

* cited by examiner

ARBOR DAMPING DEVICE

BACKGROUND OF THE INVENTION

Field of the Invention

The present invention relates to a damping device, especially to an arbor damping device.

Description of the Prior Art

Vibration of a cutter has a huge impact to surface quality of a workpiece when machining, and it makes processing programs complicated and costs too much processing time. Therefore, it is an important goal to reduce the vibration of the cutter.

However, the vibration includes an axial direction vibration and a radial direction vibration of a tool shank. A conventional damping mechanism is composed of multiple components, and a rubber is used to buffer between the components and between the components and an arbor. The manufacturing and assembly procedure is more complicated, and an axial damping effect needs to be improved.

The present invention is, therefore, arisen to obviate or at least mitigate the above-mentioned disadvantages.

SUMMARY OF THE INVENTION

The main object of the present invention is to provide an arbor damping device, which is able to achieve a better damping effect in an axial direction and a radial direction of an arbor, having simple structure and easier to process and assemble.

To achieve the above and other objects, the present invention provides an arbor damping device, including: a rod body, having an internal chamber, the internal chamber including a circumferential wall and two end walls; a damper, receiving in the internal chamber, including a side surface opposite to the circumferential wall and two end surfaces respectively opposite to the two end walls; two flexible absorbers, disposed between the two end walls and the two end surfaces respectively; at least one flexible damping adjusting member, radially disposed between the circumferential wall and the side surface, and axially disposed between the end walls and the two flexible absorbers.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
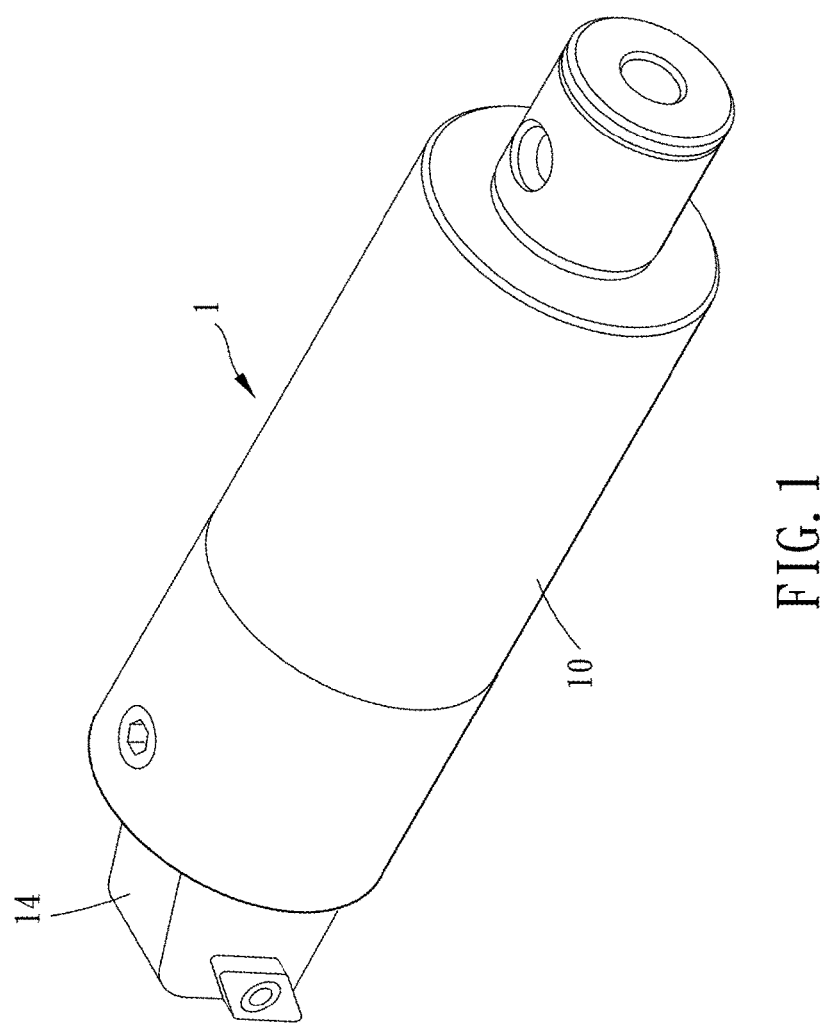
FIG. 1 is a stereogram of a preferable embodiment of the present invention.
Figure 2:
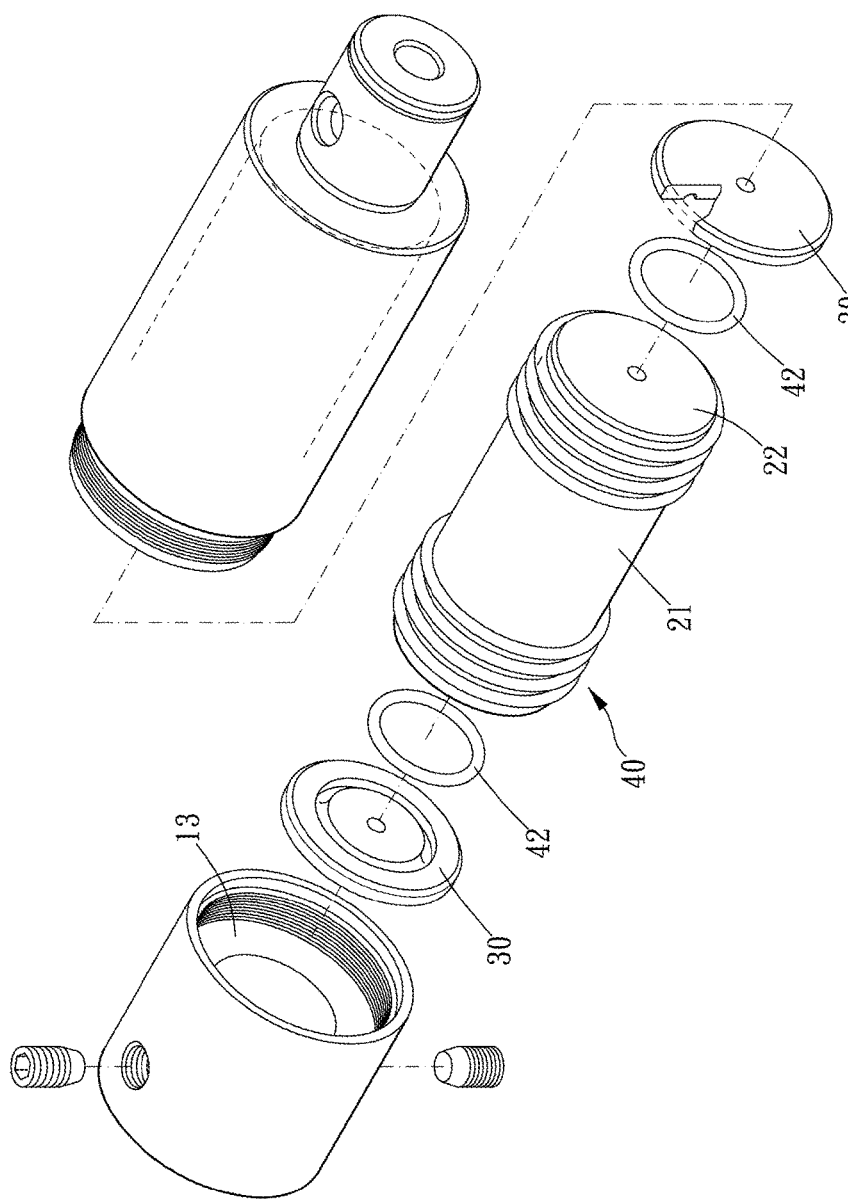
FIG. 2 is a breakdown drawing of a preferable embodiment of the present invention.
Figure 3:
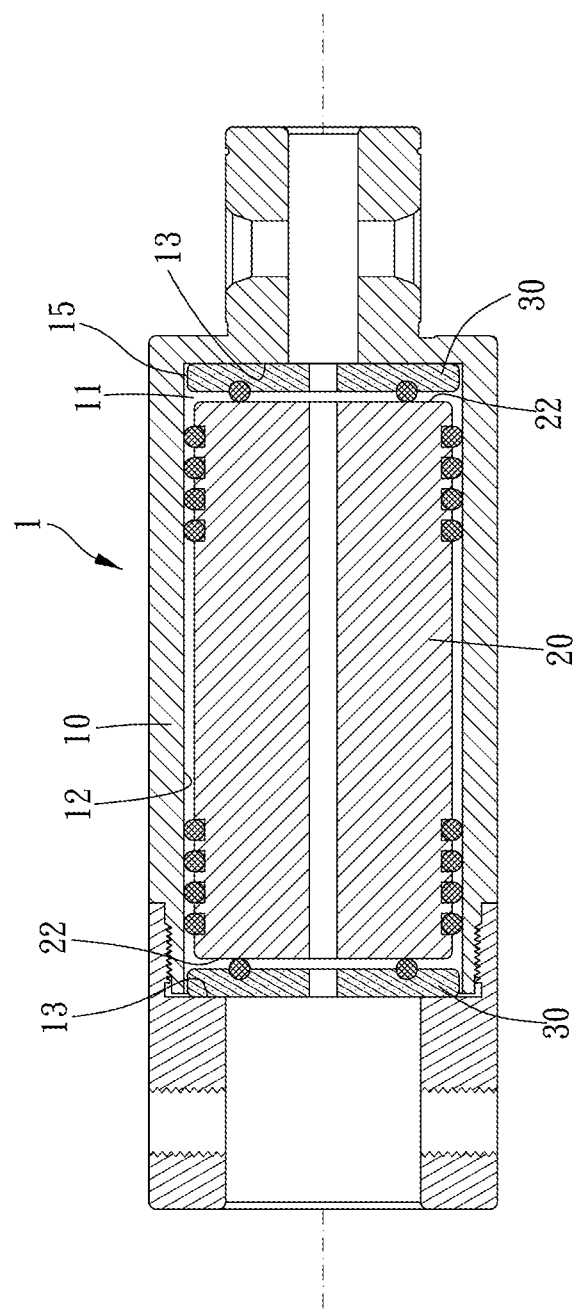
FIG. 3 is a cross-sectional view of a preferable embodiment of the present invention.
Figure 4:
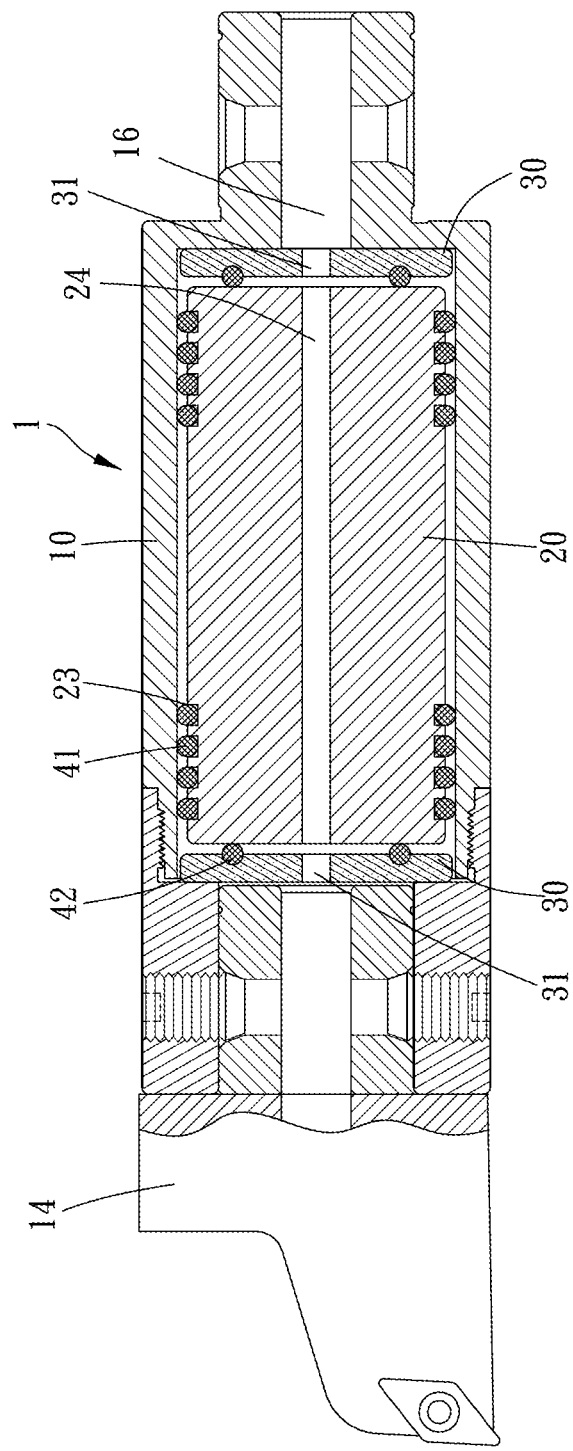
FIG. 4 is application schematic diagram of a preferable embodiment of the present invention.

Please refer to FIGS. 1 to 4 for a preferable embodiment of the present invention. An arbor damping device 1 of the present invention includes a rod body 10, a damper 20, two flexible absorbers 30 and at least one flexible damping adjusting member 40.

The rod body 10 has an internal chamber 11, the internal chamber 11 including a circumferential wall 12 and two end walls 13. The damper 20 is received in the internal chamber 11, the damper 20 including a side surface 21 opposite to the circumferential wall 12 and two end surfaces 22 respectively opposite to the two end walls 13. The two flexible absorbers 30 are disposed between the two end walls 13 and the two end surfaces 22 respectively. The at least one flexible damping adjusting member may be increased in number according to actual needs. Preferably, a number of the flexible damping adjusting member 40 is plural as shown in figures. The plurality of flexible damping adjusting members 40 are radially disposed between the circumferential wall 12 and the side surface 21, and axially disposed between the end walls 13 and the two flexible absorbers 30. Therefore, the damper 20 is able to reduce a magnitude of vibration when an arbor vibrates, and the plurality of flexible damping adjusting members 40 can provide cushion for vibrations in an axial direction and a radial direction. The vibration in the axial direction can further be buffered by the two flexible absorbers 30.

In more detail, one end of the rod body 10 has a cutter head 14, such as a turning tool, a milling cutter, a boring cutter or other cutting tools.

A flexibility of each of the flexible absorbers 30 is smaller than that of each of the end walls 13 but larger than that of the flexible damping adjusting members 40. As a result, a part of the plurality of flexible damping adjusting members 40 is sufficiently supported in the axial direction and can effectively absorb the axial vibration to prevent the flexible damping adjusting members 40 from being compressed and damaged by the rod body 10 and the damper 20. Preferably, each of the flexible absorbers 30 is plastic, such as polyurethane and ultra-high molecular weight polyethylene. The materials described above are commonly used in machine tools, but any material that is easy to process and has a flexibility between the rod body 10 and the flexible damping adjusting member 40 can be chosen as material of the flexible absorbers 30.

An interspace 15 is formed between each of the flexible absorbers 30 and the circumferential wall 12 in the radial direction. Preferably, the interspace 15 is smaller than or equal to one fifth of a thickness of each of the flexible absorbers 30. The flexible absorbers 30 will produce a radial deformation when subjected to an axial compression, and the interspace 15 is able to avoid the circumferential wall 12 from restricting a radial deformation of the flexible absorbers 30 to reduce vibration absorbing effect of the flexible absorbers 30 or to damage the flexible absorbers 30.

Preferably, the damper 20 is columnar, the plurality of flexible damping adjusting members 40 including at least one first flexible damping adjusting ring 41. The side surface 21 has at least one circular groove 23, and the at least one first flexible damping adjusting ring 41 is embedded in the at least one circular groove 23 of the side surface 21. In this embodiment, each of two ends of the side surface 21 has four circular grooves 23, and each of the circular grooves 23 embeds one of the first flexible damping adjusting ring 41 therein. The number of configurations is not limited.

The plurality of flexible damping adjusting members 40 further include at least two second flexible damping adjusting rings 42, and the at least two second flexible damping adjusting rings 42 are axially biased between the end walls 13 and the two flexible absorbers 30. In this embodiment, one of the second flexible damping adjusting rings 42 is biased between one of the end walls 13 and one of the flexible absorbers 30. However, two or more of the flexible absorbers (made of the same or different material or having the same or different flexibility) also can be set respectively according to actual needs. The two second flexible damping adjusting rings 42 are embedded in the two flexible absorbers 30 respectively to restrict the at least two second flexible damping adjusting rings 42 at a position coaxial with the damper 20 so as to avoid the damping effect from reducing caused by a radial displacement of the two second flexible damping adjusting rings 42. Preferably, an external diameter of each of the second flexible damping adjusting rings 42 is smaller than a radial dimension of each of the circumferential wall 12 for easy assembly and to avoid from restricting the radial deformation of the second flexible damping adjusting rings 42 to provide a better damping effect. A cross section of a ring body of the second flexible damping adjusting rings 42 is smaller than or equal to that of the first flexible damping adjusting ring 41. The smaller cross section of the ring results in an smaller interval between the end walls 13 and the two flexible absorbers 30. As a result, less cooling liquid will flow into an invalid space via a through hole, and the cooling liquid can flow smoothly when processing. In more detail, two ends of the rod body 10 have a perforation 16, and the damper 20 has a through hole 24 extending along the axial direction. Each of the flexible absorbers 30 has a perforation 31, and the through hole 24 and the two perforations 16, 31 are communicated. Therefore, the cooling liquid can flow through the perforations 16, 31 and the through hole 24, and then flow out from the cutter head 14 to reduce the temperature and remove debris at the processed portion.

In summary, the plurality of flexible damping adjusting members and the flexible absorbers are arranged on the axial direction and the radial direction of the damper to achieve better damping effect in the axial direction and the radial direction of the arbor.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An arbor damping device, including:
   a rod body, having an internal chamber, the internal chamber including a circumferential wall and two end walls;
   a damper, receiving in the internal chamber, including a circumferential surface opposite to the circumferential wall and two end surfaces respectively opposite to the two end walls;
   two flexible absorbers, disposed between the two end walls and the two end surfaces respectively;
   at least one flexible damping adjusting member, radially disposed between the circumferential wall and the circumferential surface, and axially disposed between the end walls and the two flexible absorbers;
   wherein a number of the flexible damping adjusting member is plural, the plurality of flexible damping adjusting members include at least two second flexible damping adjusting rings, and the at least two second flexible damping adjusting rings are axially biased between the end walls and the two flexible absorbers.

2. The arbor damping device of claim 1, wherein one end of the rod body further has a cutter head.

3. The arbor damping device of claim 1, wherein a flexibility of each of the flexible absorbers is smaller than that of each of the end walls and larger than that of the flexible damping adjusting member.

4. The arbor damping device of claim 3, wherein each of the flexible absorbers is plastic.

5. The arbor damping device of claim 1, wherein an interspace is formed between each of the flexible absorbers and the circumferential wall in a radial direction.

6. The arbor damping device of claim 1, wherein the damper is columnar, each of the plurality of flexible damping adjusting members includes at least one first flexible damping adjusting ring, and the at least one first flexible damping adjusting ring is sleeved onto the circumferential surface.

7. The arbor damping device of claim 1, wherein the at least two second flexible damping adjusting rings are embedded in the two flexible absorbers.

8. The arbor damping device of claim 7, wherein each of the flexible absorbers is smaller than the end walls and larger than the flexible damping adjusting member in flexibility; each of the flexible absorbers is plastic; an interspace is formed between each of the flexible absorbers and the circumferential wall in a radial direction, the interspace is smaller than or equal to one fifth of a thickness of each of the flexible absorbers; the damper is columnar, the circumferential surface has at least one circular groove, the plurality of flexible damping adjusting members include at least one first flexible damping adjusting ring, the at least one first flexible damping adjusting ring is embedded in the at least one circular groove; an external diameter of each of the second flexible damping adjusting rings is smaller than a radial dimension of each of the circumferential wall; a cross section of a ring body of the at least one second flexible damping adjusting rings is smaller than or equal to that of the at least one first flexible damping adjusting ring.

9. The arbor damping device of claim 1, wherein two ends of the rod body have a perforation respectively, the damper has a through hole extending along the axial direction, each of the two flexible absorbers has a perforation, and the through hole and the two perforations are communicated.

* * * * *